(12) United States Patent
Jia

(10) Patent No.: US 7,804,257 B2
(45) Date of Patent: Sep. 28, 2010

(54) CONTROL CIRCUIT FOR IDENTIFYING POWER ADAPTOR AND METHOD FOR USE THEREOF

(75) Inventor: Yu-Sen Jia, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 970 days.

(21) Appl. No.: 11/565,893

(22) Filed: Dec. 1, 2006

(65) Prior Publication Data

US 2008/0129123 A1 Jun. 5, 2008

(51) Int. Cl.
*H05B 37/02* (2006.01)

(52) U.S. Cl. .................... 315/307; 315/209 R

(58) Field of Classification Search ........... 315/209 R, 315/224, 225, 245, 246, 291, 307, 362; 363/106, 363/123, 127
See application file for complete search history.

(56) References Cited

U.S. PATENT DOCUMENTS

| | | | | |
|---|---|---|---|---|
| 3,585,404 A | * | 6/1971 | Le Vake | 307/252 |
| 4,651,081 A | * | 3/1987 | Nishimura et al. | 320/123 |
| 5,751,564 A | | 5/1998 | Dien | |
| 5,811,895 A | | 9/1998 | Suzuki et al. | |
| 6,011,362 A | * | 1/2000 | Moisin | 315/307 |
| 6,373,230 B2 | * | 4/2002 | Jabaji | 322/28 |
| 7,023,179 B2 | | 4/2006 | Nagai et al. | |
| 7,268,621 B2 | * | 9/2007 | Kanoh et al. | 330/251 |

FOREIGN PATENT DOCUMENTS

| | | |
|---|---|---|
| TW | 437148 | 5/2001 |
| TW | M282423 | 12/2005 |

* cited by examiner

*Primary Examiner*—Douglas W Owens
*Assistant Examiner*—Jimmy T Vu
(74) *Attorney, Agent, or Firm*—Jeffrey T. Knapp

(57) ABSTRACT

A control circuit (100) being adapted for identifying an adaptor of an electronic device includes an adaptor-side circuit (110) that is incorporated in the adaptor and a system-side circuit (120) that is incorporated in the electronic device. The adaptor-side circuit converts a high alternating voltage coming from a power source to a low direct voltage and has a positive output terminal and a negative output terminal. A voltage dividing circuit (30) is connected with the positive output terminal, and has a control terminal outputting a voltage. The system-side circuit includes a switching circuit (40) connected to the positive output terminal and the control terminal. The voltage outputted by the control terminal is used to switch on the switching circuit in order to energize the electronic device via the direct current voltage outputted by the positive and negative output terminals.

16 Claims, 5 Drawing Sheets

US 7,804,257 B2

CONTROL CIRCUIT FOR IDENTIFYING POWER ADAPTOR AND METHOD FOR USE THEREOF

BACKGROUND OF THE INVENTION

1. Field of the Invention

The present invention relates generally to a control circuit, and more particularly to a control circuit being used for identifying an adaptor used with an electronic device when the adaptor is used to power the electronic device. The present invention also relates to a method for identifying adaptors.

2. Description of Related Art

As our world becomes more technologically advanced, the demand for electrical power becomes more sophisticated. With the advent of portable electronic devices, such as notebook computers, mobile telephones, personal digital assistants (PDAs), digital still/dynamic cameras, etc, there is increasing demand for increased electrical power supply duration for these electronic devices.

Conventionally, these portable electronic devices rely on batteries or are electrically connected to an AC/DC power adaptor to get power. Referring to FIG. 5, a power adaptor according to related art is shown to generally include a step-down circuit 10 and a rectifier circuit 20. The step-down circuit 10 receives an external high alternating current voltage from an AC voltage source (not shown) and converts the received high alternating current voltage to a low alternating current voltage. The rectifier circuit 20 then converts the low alternating current voltage into a low direct current voltage that is outputted through positive and negative output terminals 1+, 2− to power a system that is connected to the adaptor, wherein the system may be an electronic device such as a notebook computer.

Adaptors are now in widespread use in electronic products, especially in the computer field. The power adaptor mentioned in FIG. 5 adopts a universal design and thus lacks the ability to identify between different electronic devices that are produced by different vendors. If the power adaptor is not the original vendor's product, it may cause some negative effects. For example, bogus adaptors cause damage to the original vendor, both in profit and the brand. Incompatible or bogus adaptors have influence on the safety and stability performance of computers, and the life thereof will be significantly shortened as a result.

It is therefore desirable to provide a control circuit capable of identifying an adaptor used with an electronic device, which can overcome the above mentioned problems.

SUMMARY OF THE INVENTION

The present invention relates to a control circuit of a power adaptor. The power adaptor is used to energize an electronic device such as a notebook computer. The control circuit is able to recognize whether the power adaptor that is being used is an original vendor's product or not. According to one embodiment of the present invention, the control circuit comprises an adaptor-side circuit and a system-side circuit. The adaptor-side circuit converts an alternating current voltage to a direct current voltage and outputs the direct current voltage through a pair of positive and negative output terminals. A dividing circuit is connected to the positive output terminal and has a voltage output control terminal. The system-side circuit comprises a switching circuit that is connected to the positive output terminal and the control terminal. The control terminal outputs a voltage to switch on the switching circuit so that the electronic device is energized by the direct current voltage outputted by the positive and negative output terminals.

The advantages of this invention can be more readily ascertained from the following description of the invention when read in conjunction with the accompanying drawings, in which:

BRIEF DESCRIPTION OF THE DRAWINGS

Many aspects of the control circuit can be better understood with reference to the following drawings. In the drawings, like reference numerals designate corresponding parts throughout the several views.

DETAILED DESCRIPTION OF THE INVENTION

Figure 1:
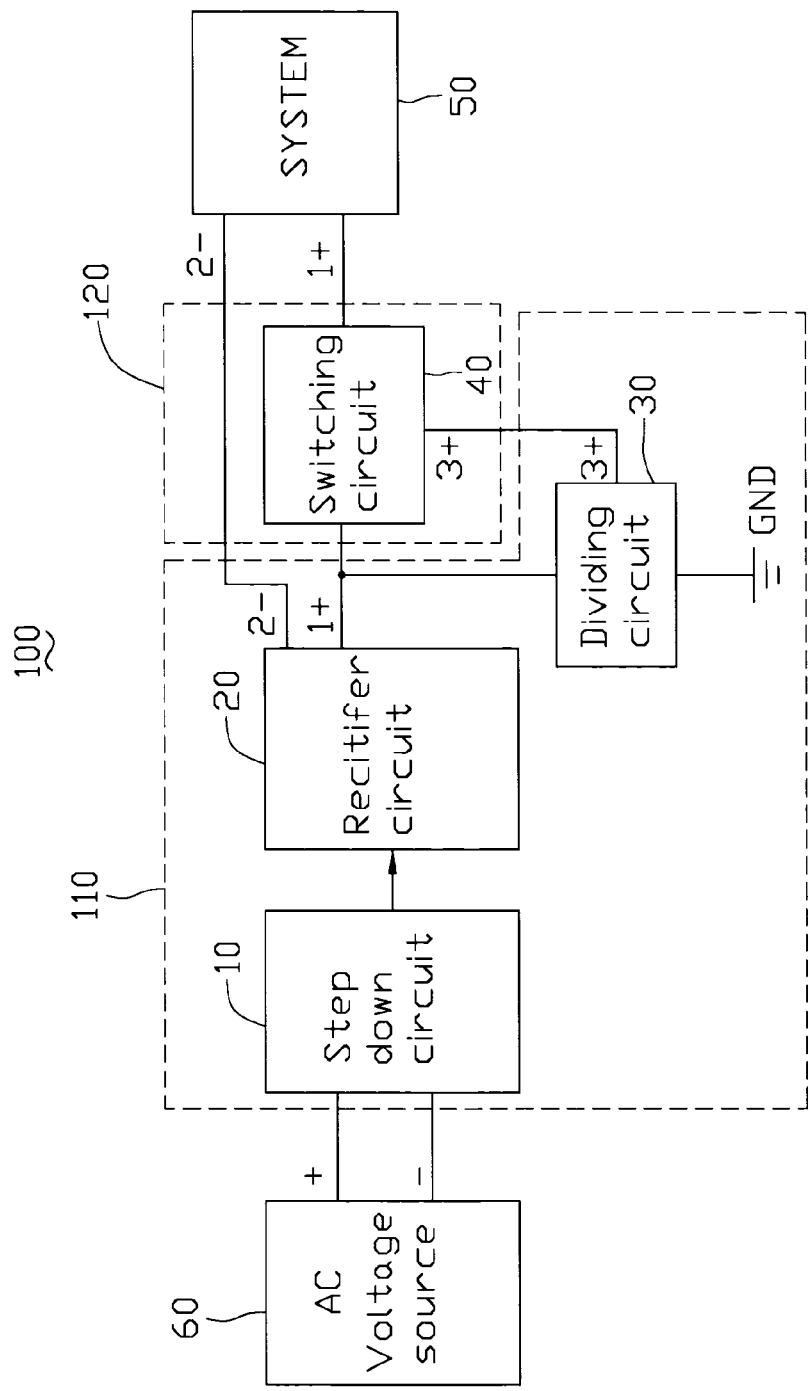
FIG. 1 is a functional block diagram of a control circuit used for identifying a power adaptor in accordance with a preferred embodiment of the present invention.

Referring to FIG. 1, a functional block diagram of a control circuit 100 used for identifying a power adaptor according to a preferred embodiment of the present invention is shown, wherein the power adaptor is used to power an electronic device such as a notebook computer, a desktop computer, a portable VCD/DVD player, a mobile phone, a television and other electronic devices that require such a power adaptor. The control circuit 100 typically comprises an adaptor-side circuit 110 and a system-side circuit 120. The control circuit 100 can be used to identify whether the power adaptor that is being used is an original vendor's product and therefore should be accepted, or a bogus product which therefore should be rejected from use, thus ensuring that the original vendor's commercial standing and benefit can be well protected and the safety and stability of the electronic device receiving power from the power adaptor can be ensured, as bogus power adaptors are properly rejected by the control circuit 100.

The adaptor-side circuit 110 comprises a step-down circuit 10, a dividing circuit 30 and a rectifier circuit 20 connected therebetween. The system-side circuit 120 comprises a switching circuit 40 connected to the adaptor-side circuit 110. A system 50 is connected with the system-side circuit 120 in order to get power from the power adaptor. The system 50 can be an electronic product such as a notebook computer, a desktop computer, a portable VCD/DVD player, a mobile phone, a television, etc. The adaptor-side circuit 110 is incorporated in the power adaptor, while the system-side circuit 120 is incorporated in, for example, a circuit board (not shown) of the system 50.

The power adaptor is connected between an AC voltage source 60 and the system 50 in order to convert an alternating current voltage that is provided by the AC voltage source 60 to a direct current voltage that the system 50 requires in order to work. Since the AC voltage source 60 provides the consumer with a high alternating current voltage while the system 50 needs a low direct current voltage for operation, the power adaptor is needed. The step-down circuit 10 and the rectifier circuit 20 cooperatively function as a conversion circuit to convert the high alternating current voltage which is provided by the AC voltage source 60 into the low direct current voltage which is supplied to the system-side circuit 120 to energize the system 50. The step-down circuit 10 firstly converts the high alternating current voltage into a low alternating current voltage, and then the rectifier circuit 20 rectifies the low alternating current voltage received from the step-down circuit 10 into the low direct current voltage. Both the step-down circuit 10 and the rectifier circuit 20 can be of conventional design.

The adaptor-side circuit 110 has three output terminals 1+, 2− and 3+, i.e., a positive output terminal 1+, a negative output terminal 2−, and a voltage output control terminal 3+. The positive output terminal 1+ and the negative output terminal 2− are derived from the rectifier circuit 20. The negative output terminal 2− is directly connected to the system 50. The dividing circuit 30 is connected between the positive output terminal 1+ and the ground (GND). The control terminal 3+ is derived from the dividing circuit 30. The positive output terminal 1+ and the control terminal 3+ are both connected to the switching circuit 40 of the system-side circuit 120, wherein the control terminal 3+ is used to switch on the switching circuit 40 in order to achieve an electrical connection between the system 50 and the power adaptor. That is, if the control terminal 3+ switches the switching circuit 40 ON, the positive output terminal 1+ of the adaptor-side circuit 110 will be electrically connected to the system 50, and the power adaptor in which the adaptor-side circuit 110 is incorporated supplies the low direct current voltage via the positive and negative output terminals 1+, 2−, thus powering the system 50 which is connected to the switching circuit 40 via the positive voltage terminal 1+.

Figure 2:
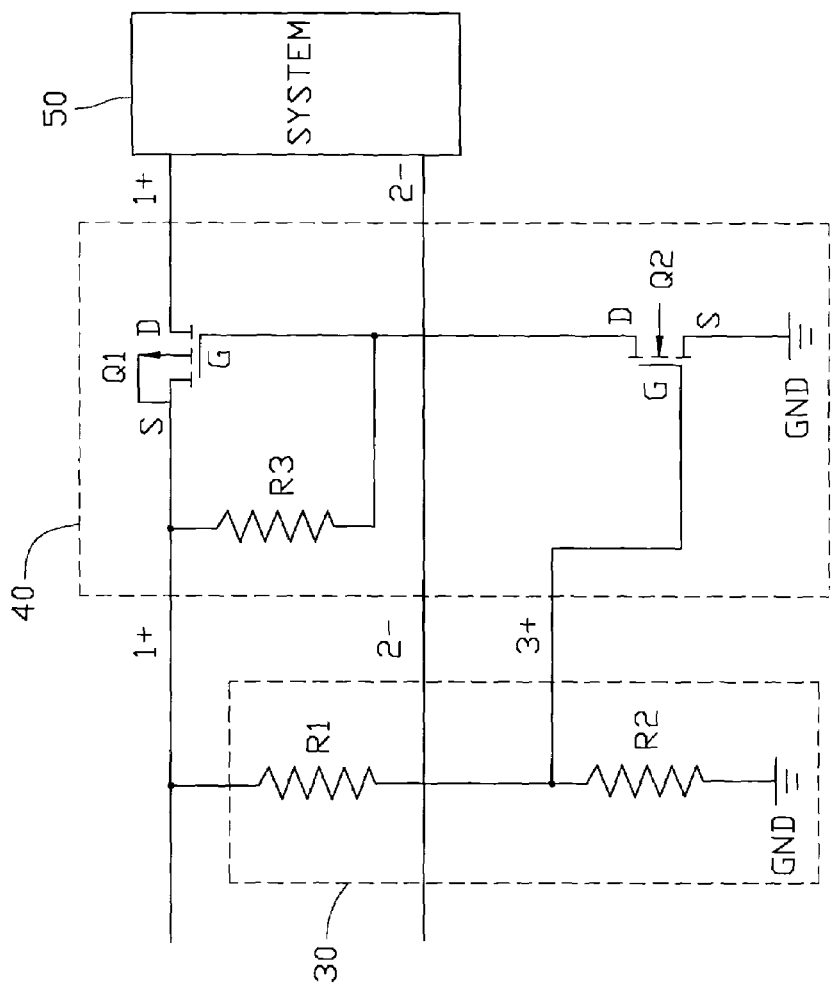
FIG. 2 is a detailed circuit diagram of a dividing circuit and a switching circuit of the control circuit of FIG. 1 according to a first example of the control circuit.

Referring to FIG. 2, the dividing circuit 30 comprises two resistors R1, R2 connected in series between the positive output terminal 1+ and the GND, and the control terminal 3+ is connected to a junction between the resistors R1 and R2. As the resistors R1, R2 are connected in series, the control terminal 3+ outputs a voltage from the resistor R2, which is lower than the voltage outputted by the positive output terminal 1+. The voltage outputted by the control terminal 3+ is used to switch on the switch circuit 40. When the power adaptor in which the adaptor-side circuit 110 is incorporated is connected with the system 50 in which the system-side circuit 120 is incorporated, the positive output terminal 1+ and the control terminal 3+ of the adaptor-side circuit 110 are connected to the switching circuit 40 of the system-side circuit 120, and the voltage outputted by the control terminal 3 is a voltage required to turn on the switching circuit 40.

The switching circuit 40 comprises two metal-oxide-semiconductor field effect transistors (MOSFETs) Q1, Q2 and a resistor R3. The gate G of Q2 is connected to the control terminal 3+ of the adaptor-side circuit 110, the source S of Q2 is connected to GND and the drain D of Q2 is connected to the gate G of Q1. The source S of Q1 is connected to the positive output terminal 1+ of the adaptor-side circuit 110, and the drain D of Q1 is connected to the system 50. The resistor R3 is connected between the source S of Q1 and the gate G of Q1. In this embodiment, Q2 is an N-channel enhancement mode MOSFET, which has a positive threshold voltage. When the bias voltage applied between the gate G and the source S of Q2 is larger than the positive threshold voltage of Q2, Q2 turns on. Q1 is a P-channel enhancement mode MOSFET. Q1 is different from Q2 because Q1 requires a negative threshold voltage, and Q1 turns on when the absolute value of the voltage applied between the gate G and the source S of the Q1 is larger than the absolute value of the negative threshold voltage of Q1. For the benefit of description and understanding, it is assumed that the negative threshold voltage of Q1 has an absolute value that is equal to the positive threshold voltage of Q2.

The working principle of the control circuit 100 may be explained in greater detail if a notebook computer is taken as an example of the system 50. It is presumed that the operating voltage of the notebook computer is 18V and Q2 has a positive threshold voltage of 4V. In this regard, the power adaptor should output a low direct current voltage of 18V through the output terminals 1+ and 2−. The output voltage of the control terminal 3+ should be larger than 4V in order to make Q2 conductive. Since the resistors R1, R2 are connected in series, the resistances of R1 and R2 can be easily determined in order to enable the control terminal 3+ to output a voltage larger than 4V, i.e., the positive threshold voltage of Q2. For example, R1 can have a resistance of 75K (kilohm), and R2 can have a resistance of 25K, the output voltage by the control terminal 3+ being 4.5V, which is larger than the positive threshold voltage of Q2 thus turning Q2 on. The drain D and the source S of Q2 become conductive. Since the drain D of Q2 is connected to the gate G of Q1, a bias voltage applied between the gate G and the source S of Q1 is the voltage applied on the resistor R3, i.e., −18V, the absolute value of which is larger than the absolute value of the negative threshold voltage of Q1 (−4V), and Q1 turns on. Thus, the drain D and the source S of Q1 become conductive, and the adaptor-side circuit 110 supplies electrical power to the system 50 of the notebook computer via the positive and negative output terminals 1+, 2−.

Figure 5:
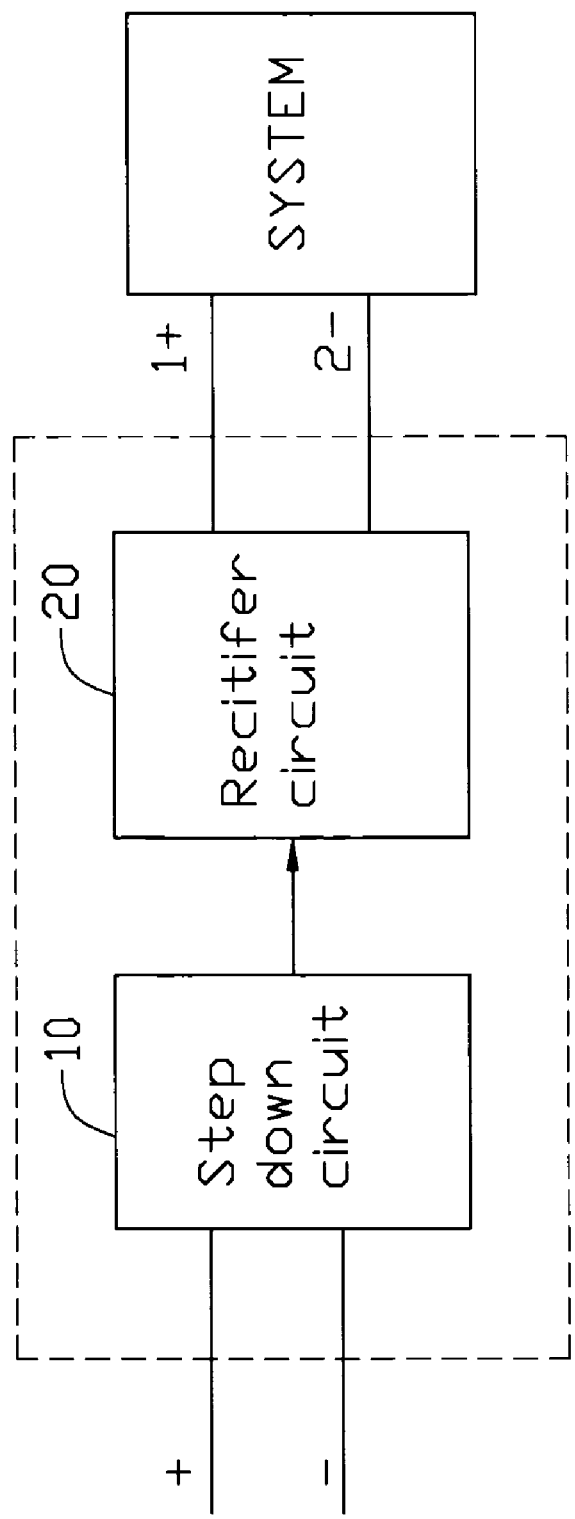
FIG. 5 is a functional block diagram of a power adaptor according to related art.

Compared with a universal type adaptor shown as related art in FIG. 5, the system-side circuit 120 has an additional switching circuit 40. The adaptor-side circuit 110 also has an additional dividing circuit 30 which uses the control terminal 3+ to switch on the switching circuit 40. In other words, the control circuit 100 uses one pin, i.e., the control terminal 3+, to identify original vendor. If the universal type adaptor shown in FIG. 5 is used, the system 50 in which the switching circuit 40 is incorporated cannot get power from this type of adaptor since no control terminal 3+ is provided in the adaptor to switch on the switching circuit 40. If the switching circuit 40 is OFF, the connection between the positive output terminal 1+ of the adaptor-side circuit 110 and the system 50 is cut off and the system 50 cannot get power, unless the power adaptor is produced by the original vendor. Only adaptors provided by original vendors in which the dividing circuit 30 and the control terminal 3+ are incorporated together are able to turn on the switch circuit 40 and supply power to the system 50, or else the switch circuit 40 is turned off and power cannot be supplied to the system 50 by the adaptors. Thus, the control circuit 100 can be used to recognize the adaptor that is being used, and ensure that the system 50 works under safe and stable conditions and avoids bogus adaptors causing harm to the device being powered. Moreover, the circuit added is simple in design and therefore the cost of including it is low.

Figure 3:
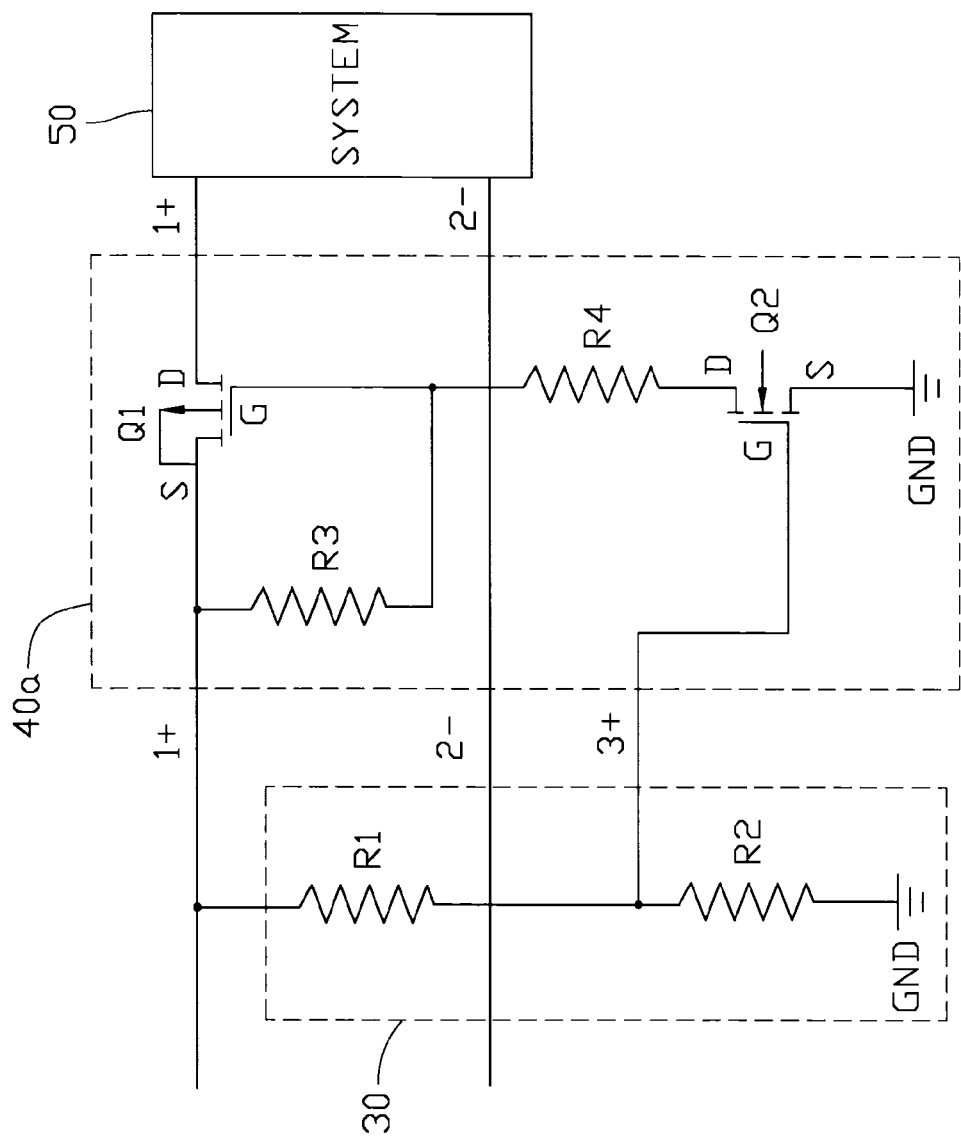
FIG. 3 is a detailed circuit diagram of a dividing circuit and a switching circuit of the control circuit of FIG. 1 according to a second example of the control circuit.

Referring to FIG. 3, a second embodiment of this invention in which the system 50 may require a relatively higher operation voltage is shown. The switching circuit 40a comprises two MOSFETs Q1, Q2 and two resistors R3, R4. The design of the two resistors R3 and R4 is used to prevent the relatively higher operation voltage from inducing a too large bias voltage applied to the MOSFET Q1, since such a too large bias voltage may cause harm to the MOSFET Q1. The junction between the resistor R3 and the gate G of Q1 is coupled to the drain D of Q2 via a resistor R4, as compared to FIG. 2. When Q2 turns on as a result of the output voltage outputted by the control terminal 3 as described in the first embodiment, the source S and the drain D of Q2 become conductive and the resistors R3, R4 form a series connection between the positive output terminal 1+ and the GND to which the source S of Q2 is connected. Thus, the bias voltage applied between the gate G and the source S of Q1 is a voltage exerted on the resistor R3, which is lower than the voltage outputted through the positive output terminal 1+. The relatively higher voltage is thus prevented from being outputted through the positive output terminal 1+ directly and entirely applied as the bias voltage of Q1.

Figure 4:
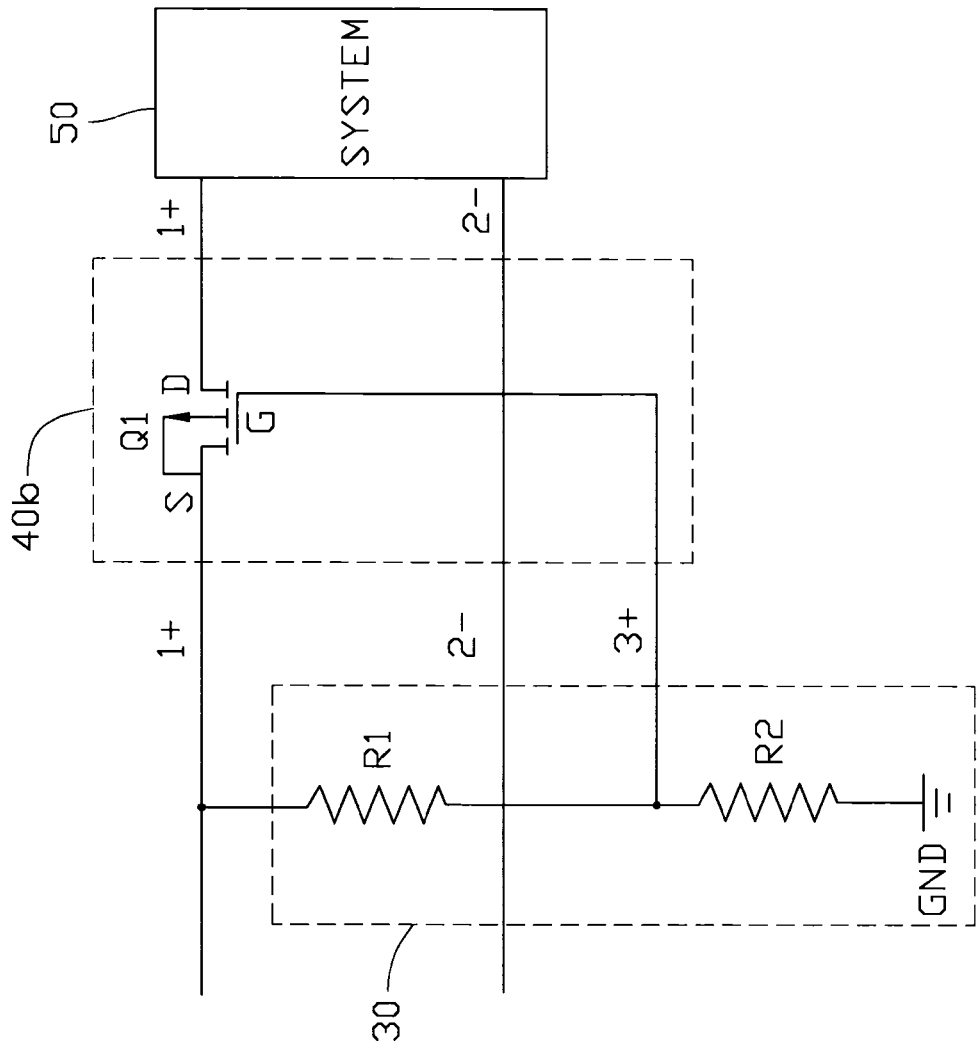
FIG. 4 is a detailed circuit diagram of a dividing circuit and a switching circuit of the control circuit of FIG. 1 according to a third example of the control circuit.

Referring to FIG. 4, a third embodiment of the present invention is shown. The switching circuit 40b comprises a P-channel enhancement mode MOSFET Q1, the gate G of which is connected to the control terminal 3+ directly. For better description and understanding, it is presumed that the operation voltage of the system 50 is 18V and the negative threshold voltage of Q1 is −4V. In this context, the bias voltage applied between the gate G and the source S of Q1 is the voltage exerted on the resistor R1, and this bias voltage should have an absolute value larger than the absolute value of the negative threshold voltage of Q1 in order to make Q1 conductive. Under this requirement, the resistances of the resistors R1, R2 can be easily determined. For example, the resistance of the resistor R1 can be 25K (kilohm) and R2 75K thus allowing the bias voltage applied between the gate G and the source S of Q1 of −4.5V to turn on. That is, the source S and the drain D become conductive. The adaptor-side circuit 110 can supply electrical power to the system 50 of the notebook computer via the positive and negative output terminals 1+ and 2−.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A control circuit being configured to identify an adaptor used with an electronic device, the control circuit comprising:
    a system-side circuit that is configured to be incorporated in the electronic device, wherein the system-side circuit includes a switching circuit; and
    an adaptor-side circuit that is configured to be incorporated in the adaptor, wherein the adaptor-side circuit is used to convert an alternating current voltage to a direct current voltage and output the direct current voltage by positive and negative output terminals thereof, one of the positive and negative output terminals is coupled to said switching circuit, the other one of the positive and negative output terminals is configured to be coupled to the electronic device, the adaptor-side circuit includes a dividing circuit connected to the one of the positive and negative output terminals that is coupled to said switching circuit, and the dividing circuit has a voltage output control terminal that is connected to said switching circuit and used to switch on said switching circuit so that the electronic device is powered;
    said switching circuit comprising two metal-oxide-semiconductor field effect transistors (MOSFETs) and a resistor, the two MOSFETs comprising a P-channel enhancement mode MOSFET whose source is connected to the positive output terminal and an N-channel enhancement mode MOSFET whose gate is connected to the control terminal, a source of the N-channel enhancement mode MOSFET being connected to ground (GND), and a drain of the N-channel enhancement mode MOSFET being connected to a gate of the P-channel enhancement mode MOSFET, the resistor being connected between the positive output terminal and the gate of the P-channel enhancement mode MOSFET, and a drain of the P-channel enhancement mode MOSFET being configured to be coupled to the electronic device.

2. The control circuit as described in claim 1, wherein the dividing circuit comprises two resistors connected in series between the positive output terminal and ground (GND), and the control terminal is connected to a junction between the two resistors.

3. A method of identifying an adaptor used with an electronic device, comprising the following steps:
    converting an alternating current voltage inputted to the adaptor into a direct current voltage and outputting the direct current voltage, via one of a pair of positive and negative output terminals of the adaptor, to a switching circuit that is incorporated in the electronic device, the switching circuit comprising a metal-oxide-semiconductor field effect transistor (MOSFET) which has a source and a drain respectively connected to the one of the pair of positive and negative output terminals of the adaptor and the electronic device, wherein the other one of the positive and negative output terminals is connected to the electronic device;
    dividing the direct current voltage to form a controlling voltage having a value lower than the direct current voltage; and
    inputting the controlling voltage to the switching circuit via a control terminal to switch on the MOSFET of the switching circuit in order to electrically connect the adaptor with the electronic device and power the electronic device using the direct current voltage.

4. The method as described in claim 3, wherein the dividing step is accomplished by a dividing circuit comprising two resistors connected in series, and the controlling voltage comes from a voltage that is distributed on one of the two resistors.

5. The method as described in claim 3, wherein the switching circuit further comprises another MOSFET and one resistor.

6. The method as described in claim 5, wherein the MOSFET is a P-channel enhancement mode MOSFET whose source is connected to the positive output terminal and the another MOSFET is an N-channel enhancement mode MOSFET whose gate is connected to the control terminal, a source of the N-channel enhancement mode MOSFET being connected to ground (GND), and a drain of the N-channel enhancement mode MOSFET being connected to a gate of the P-channel enhancement mode MOSFET, the resistor being connected between the positive output terminal and the gate of the P-channel enhancement mode MOSFET, and the drain of the P-channel enhancement mode MOSFET being coupled to the electronic device.

7. The method as described in claim 3, wherein the switching circuit comprises another MOSFET and two resistors.

8. The method as described in claim 7, wherein the MOSFET is a P-channel enhancement mode MOSFET whose source is connected to the positive output terminal and the another MOSFET is an N-channel enhancement mode MOSFET whose gate is connected to the control terminal, a source of the N-channel enhancement mode MOSFET being connected to ground (GND), a drain of the N-channel enhancement mode MOSFET being connected to a gate of the P-channel enhancement mode MOSFET via one of the two resistors, the other one of the two resistors being connected between the positive output terminal and the gate of the P-channel enhancement mode MOSFET, the drain of the P-channel enhancement mode MOSFET being coupled to the electronic device.

9. The method as described in claim 3, wherein the MOSFET is a P-channel enhancement mode MOSFET, a source of the P-channel enhancement mode MOSFET being connected to the positive output terminal, a gate of the P-channel enhancement mode MOSFET being connected to the control terminal, and a drain of the P-channel enhancement mode MOSFET being coupled to the electronic device.

10. A control circuit for identifying an adaptor for an electronic device, wherein the adaptor is used for converting AC power to DC power to be used by the electronic device, the control circuit comprising:
   a dividing circuit incorporated in the adaptor, comprising two resistors connected in series, wherein one of the resistors is connected with a positive output terminal of the adaptor and the other one of the resistors is connected to ground, a control terminal extending from a junction between the two resistors; and
   a switching circuit comprising first and second input terminals connecting with the positive output terminal of the adaptor and the control terminal, respectively, and an output terminal connecting with the electronic device, the switching circuit comprising a metal-oxide-semiconductor field effect transistor (MOSFET) which has a drain and a source respectively functioning as the first input terminal and the output terminal, wherein when a the MOSFET in the switching circuit is turned on by the control terminal, the DC power flows from the positive output terminal through the first input terminal and the output terminal of the switch circuit to the electronic device.

11. The control circuit as described in claim 10, wherein the switching circuit further comprises another MOSFET, the MOSFET is a P-channel enhancement mode MOSFET whose source is connected to the positive output terminal, and the another MOSFET is an N-channel enhancement mode MOSFET whose gate is connected to the control terminal, a source of the N-channel enhancement mode MOSFET being connected to ground (GND), and a drain of the N-channel enhancement mode MOSFET being connected to a gate of the P-channel enhancement mode MOSFET, and the drain of the P-channel enhancement mode MOSFET being coupled to the electronic device.

12. The control circuit as described in claim 11, wherein the source and gate of the P-channel enhancement mode MOSFET are interconnected by a third resistor.

13. The control circuit as described in claim 12, further comprising a fourth resistor interconnecting a junction between the third resistor and the gate of the P-channel enhancement mode MOSFET and the drain of the N-channel enhancement mode MOSFET.

14. The control circuit as described in claim 10, wherein the MOSFET is a P-channel enhancement mode MOSFET, the source of the P-channel enhancement mode MOSFET being connected to the positive output terminal, a gate of the P-channel enhancement mode MOSFET being connected to the control terminal, and the drain of the P-channel enhancement mode MOSFET being coupled to the electronic device.

15. A control circuit being configured to identify an adaptor used with an electronic device, the control circuit comprising:
   a system-side circuit that is configured to be incorporated in the electronic device, wherein the system-side circuit includes a switching circuit; and
   an adaptor-side circuit that is configured to be incorporated in the adaptor, wherein the adaptor-side circuit is used to convert an alternating current voltage to a direct current voltage and output the direct current voltage by positive and negative output terminals thereof, one of the positive and negative output terminals is coupled to the switching circuit, the other one of the positive and negative output terminals is configured to be coupled to the electronic device, the adaptor-side circuit includes a dividing circuit connected to the one of the positive and negative output terminals that is coupled to the switching circuit, and the dividing circuit has a voltage output control terminal that is connected to the switching circuit and used to switch on the switching circuit so that the electronic device is powered;
   the switching circuit comprising two metal-oxide-semiconductor field effect transistors (MOSFETs) and two resistors, the two MOSFETs comprising a P-channel enhancement mode MOSFET whose source is connected to the positive output terminal and an N-channel enhancement mode MOSFET whose gate is connected to the control terminal, a source of the N-channel enhancement mode MOSFET being connected to ground (GND), a drain of the N-channel enhancement mode MOSFET being connected to a gate of the P-channel enhancement mode MOSFET via one of the two resistors, the other one of the two resistors being connected between the positive output terminal and the gate of the P-channel enhancement mode MOSFET, and a drain of the P-channel enhancement mode MOSFET being configured to be coupled to the electronic device.

16. A control circuit being configured to identify an adaptor used with an electronic device, the control circuit comprising:
   a system-side circuit that is configured to be incorporated in the electronic device, wherein the system-side circuit includes a switching circuit; and
   an adaptor-side circuit that is configured to be incorporated in the adaptor, wherein the adaptor-side circuit is used to convert an alternating current voltage to a direct current voltage and output the direct current voltage by positive and negative output terminals thereof, one of the positive and negative output terminals is coupled to the switching circuit, the other one of the positive and negative output terminals is configured to be coupled to the electronic device, the adaptor-side circuit includes a dividing circuit connected to the one of the positive and negative output terminals that is coupled to the switching circuit, and the dividing circuit has a voltage output control terminal that is connected to the switching circuit and used to switch on the switching circuit so that the electronic device is powered;
   the switching circuit comprising a P-channel enhancement mode metal-oxide-semiconductor field effect transistor (MOSFET), a source of the P-channel enhancement mode MOSFET being connected to the positive output terminal, a gate of the P-channel enhancement mode MOSFET being connected to the control terminal, and a drain of the P-channel enhancement mode MOSFET being configured to be coupled to the electronic device.

* * * * *